United States Patent
V M et al.

(10) Patent No.: US 11,874,771 B2
(45) Date of Patent: Jan. 16, 2024

(54) MULTIPLE INDIRECTION SIZES FOR LOGICAL-TO-PHYSICAL TRANSLATION TABLES

(71) Applicant: Western Digital Technologies, Inc., San Jose, CA (US)

(72) Inventors: Arvind Kumar V M, Bangalore (IN); Ravishankar Surianarayanan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 46 days.

(21) Appl. No.: 17/744,901

(22) Filed: May 16, 2022

(65) Prior Publication Data
US 2023/0367708 A1  Nov. 16, 2023

(51) Int. Cl.
*G06F 12/02* (2006.01)
*G06F 13/16* (2006.01)
*G06F 12/06* (2006.01)

(52) U.S. Cl.
CPC ...... *G06F 12/0246* (2013.01); *G06F 12/0653* (2013.01); *G06F 13/1668* (2013.01); *G06F 2212/7201* (2013.01)

(58) Field of Classification Search
CPC ............. G06F 12/0246; G06F 12/0653; G06F 13/1668; G06F 2212/7201
See application file for complete search history.

(56) References Cited

U.S. PATENT DOCUMENTS

| | | | |
|---|---|---|---|
| 10,409,500 B2 | 9/2019 | Trika et al. | |
| 10,884,916 B2 | 1/2021 | Trika et al. | |
| 10,949,120 B2 | 3/2021 | Bahirat et al. | |
| 11,734,189 B2 * | 8/2023 | Subbarao | G06F 12/0875 711/206 |
| 2019/0079681 A1 * | 3/2019 | Trika | G06F 3/0604 |
| 2020/0363998 A1 | 11/2020 | Walker et al. | |
| 2021/0157720 A1 * | 5/2021 | Bert | G06F 3/0626 |
| 2022/0300431 A1 * | 9/2022 | Subbarao | G06F 12/0873 |
| 2022/0300432 A1 * | 9/2022 | Subbarao | G06F 12/0246 |

\* cited by examiner

*Primary Examiner* — Tasnima Matin
(74) *Attorney, Agent, or Firm* — Michael Best & Friedrich LLP

(57) ABSTRACT

Multiple logical-to-physical translation tables (L2PTTs) for data storage devices having indirection units of different sizes. In one embodiment, a data storage controller includes a memory interface configured to interface with a memory, the memory including a zoned namespace, the zoned namespace including a plurality of zones. The data storage controller includes a controller memory including two or more logical-to-physical translation tables (L2PTTs), and an electronic processor. The electronic processor is configured to receive data to be stored in a zone of the plurality of zones, determine whether the zone is an active zone, select, in response to determining that the zone is the active zone, a first L2PTT having a first indirection unit size, and select, in response to determining that the zone is not the active zone, a second L2PTT having a second indirection unit size.

20 Claims, 8 Drawing Sheets

MULTIPLE INDIRECTION SIZES FOR LOGICAL-TO-PHYSICAL TRANSLATION TABLES

FIELD

This application relates generally to data storage devices, and more particularly, to a data storage controller that implements zoned and un-zoned namespaces to reduce the size of logical block address to physical address in NAND lookup tables.

BACKGROUND

Generally, solid state drives (SSDs) use a logical-to-physical translation table (L2PTT) to convert logical block addresses (LBAs) to physical addresses in NAND. The L2PTT has an indirection unit, which defines the size of the data in the NAND array that a single entry in the L2PTT refers to. If the unit of indirection is small, the L2PTT is large. Alternatively, if the unit of indirection is large, then the number of "Read-Modify-Write" (RMW) operations of the SSD increases. Prior approaches to reduce the size of the L2PTT involve the use of large logical pages (lpage). Each entry in the L2PTT addresses large lpage size, such as 32 kilobytes (KB). However, this smaller size of the lookup table results in a larger RMW requirement.

SUMMARY

To solve these and other problems, the embodiments described herein provide for zoned namespaces combined with un-zoned namespaces that reduce the size of the lookup table. Zoned namespaces contain multiple zones of equal size. Active zones within the zone namespace are open zones to which writing operations is permitted. Once an active zone is completely written to, the active zone becomes a closed (or inactive) zone. Overwrites are not permitted in closed zones unless the zone is completely reset. Accordingly, to reduce the amount of memory dedicated to the L2PTT, closed zones may be assigned an L2PTT with a larger indirection unit size (and therefore a smaller L2PTT). As active zones are still dynamic and may change, the active zones may be assigned an L2PTT with a smaller indirection unit size (and therefore a larger L2PTT).

Un-zoned namespaces may be written to with small random data, such as metadata. Accordingly, as the un-zoned namespace increases in size, a L2PTT with a larger indirection unit size may be selected. When the un-zoned namespace is small, a L2PTT with a smaller indirection unit size may be selected. However, data written to the un-zoned may be "hot" data, i.e., data that experiences lots of overwriting. Accordingly, when the data is identified as hot data, a L2PTT with a smaller indirection unit size may be selected.

The disclosures provides a data storage controller including, in one embodiment, a memory interface configured to interface with a memory, a controller, and an electronic processor. The memory includes a zoned namespace. The zoned namespace includes a plurality of zones. A controller memory includes two or more logical-to-physical translation tables (L2PTTs). The electronic processor is communicatively connected to the controller memory. The electronic processor is configured to receive data to be stored in a zone of the plurality of zones and determine whether the zone is an active zone. In response to determining that the zone is the active zone, the electronic processor is configured to select a first L2PTT having a first indirection unit size. In response to determining that the zone is not the active zone, the electronic processor is configured to select a second L2PTT having a second indirection unit size. The first indirection unit size is smaller than the second indirection unit size.

The disclosure also provides a method. In one embodiment, the method includes receiving, with an electronic processor of a data storage controller, data to be stored in a namespace. The method includes determining whether the namespace includes a plurality of zones and determining, in response to determining that the namespace includes the plurality of zones, whether a first zone of the plurality of zones is active. The method includes selecting, in response to determining that the first zone is the active zone, a first logical-to-physical translation table (L2PTT) having a first indirection unit size, and selecting, in response to determining that the first zone is not the active zone, a second L2PTT having a second indirection unit size.

The disclose also provides a memory device that supports multiple indirection unit sizes for logical-to-physical translation tables (L2PTTs). In one embodiment, the memory device includes a memory and a controller. The memory includes a plurality of L2PTTs. The controller is configured to select one of the plurality of L2PTTs based on whether a namespace in which to store data is a zoned namespace.

Various aspects of the present disclosure provide for improvements data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Figure 1:
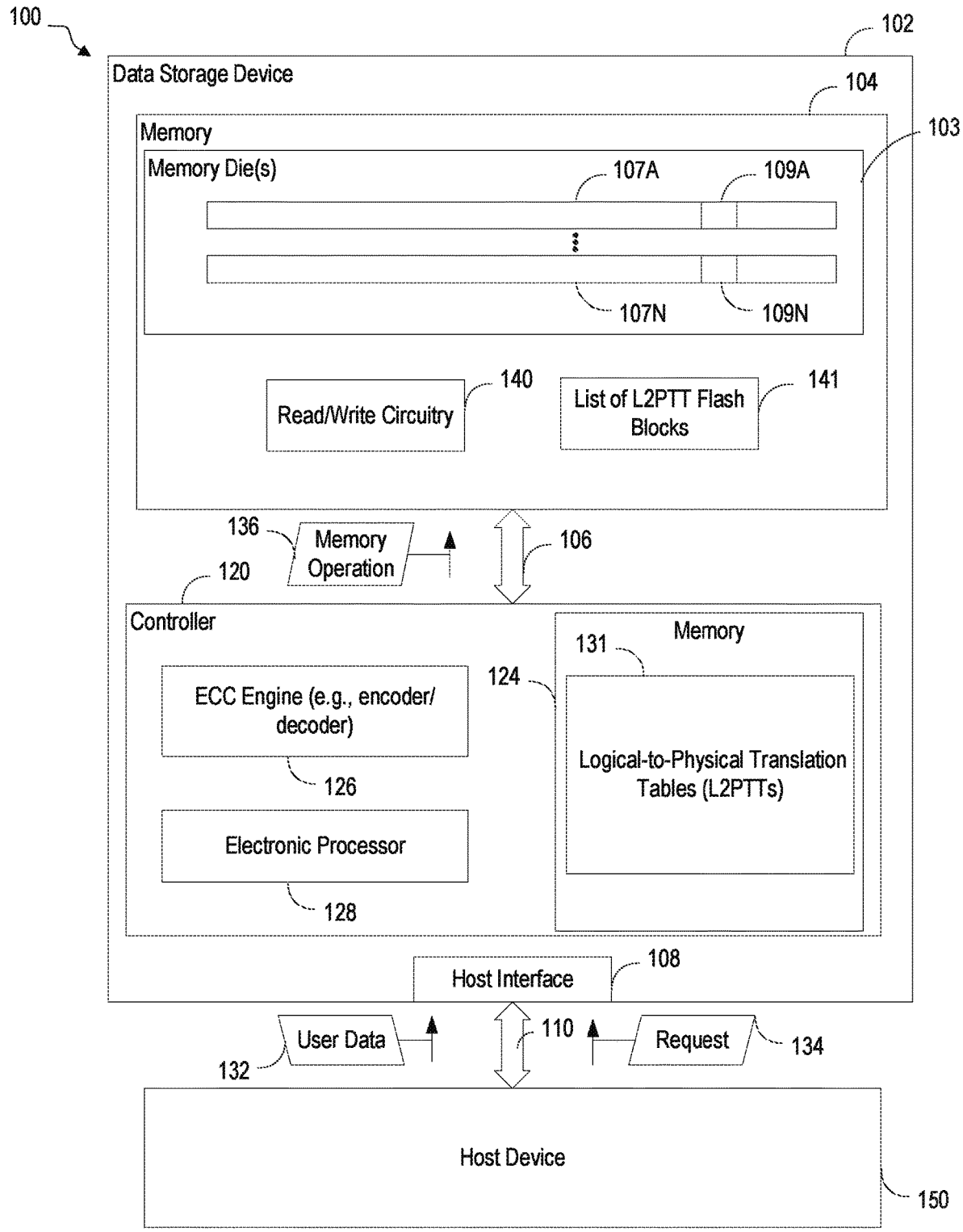
FIG. 1 is block diagram of a system including a data storage device and a host device, in accordance with some embodiments of the disclosure.

FIG. 1 is block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled via a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 via the communication path 110, such as a wired communication path and/or a wireless communication path. For example, the data storage device 102 may include an interface 108 (e.g., a host interface) that enables communication via the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. Additionally, the host device 150 may issue one or more vendor specific commands to the data storage device 102 to notify and/or configure the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

The host device 150 communicates via a memory interface that enables reading from the memory 104 and writing to the memory 104. In some examples, the host device 150 may operate in compliance with an industry specification, a Secure Digital (SD) Host Controller specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a word line. The group of storage elements 107 may include multiple storage elements, such as a representative storage elements 109A and 109N, respectively. The group of storage elements 107A-107N may include zoned and un-zoned namespaces for storing data.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies. The memory 104 may also include a list of L2PTT flash blocks 141.

The data storage device 102 includes the data storage device controller 120 coupled to the memory 104 (e.g., the one or more memory dies 103) via a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 via the interface 108, and the data storage device controller 120 may receive data from the host device 150 via the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. In particular, the memory 124 stores at least one logical-to-physical translation table (L2PTT) 131 as described in greater detail below.

Additionally, although the data storage device controller 120 is illustrated in FIG. 1 as including the memory 124, in other implementations, some or all of the memory 124 is instead located separate from the data storage device controller 120 and executable by the electronic processor 128 or a different electronic processor that is external to the data storage device controller 120 and/or the data storage device 102. For example, the memory 124 may be dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The data storage device controller 120 may send the memory operation 136 (e.g., a read command) to the memory 104 to cause the read/write circuitry 140 to sense data stored in a storage element. For example, the data storage device controller 120 may send the read command to the memory 104 in response to receiving a request for read access from the host device 150.

Figure 2:
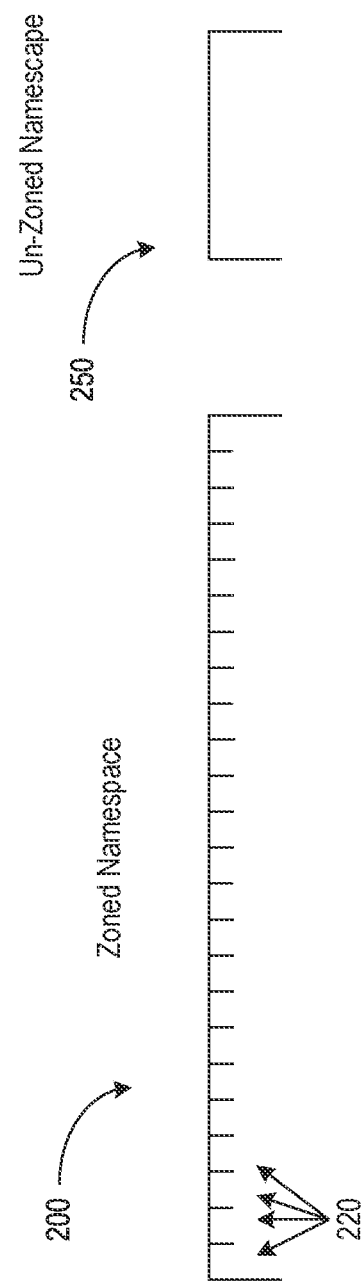
FIG. 2 is a diagram illustrating example zoned and un-zoned namespaces, in accordance with some embodiments of the present disclosure.

As stated above, the group of storage elements 107A-107N may include zoned and un-zoned namespaces for storing data. FIG. 2 illustrates a zoned namespace 200 and an un-zoned namespace 250. The zoned namespace 200 includes a plurality of zones 220. In some implementations, each zone 220 has an equal size. However, in other implementations, the size of each zone 220 may vary. The plurality of zones 220 include active zones and closed (or inactive) zones. Active zones are zones open for WRITE commands, where data may be stored in the zone 220. Once an active zone is completely written to, the zone becomes a closed zone. In some implementations, closed zones are not able to be overwritten unless the zone 220 is reset (e.g., erased) before being written to again (as an active zone). The plurality of zones 220 may be written to in sequential order (e.g., from left to right).

The un-zoned namespace 250 includes only a single "zone" in which to store data. The un-zoned namespace 250 may store, for example, metadata related to the plurality of zones 220 in the zoned namespace 200. In some implementations, multiple un-zoned namespaces 250 are used to store data. In other implementations, the size of the un-zoned namespace 250 is dynamic. Accordingly, as more data is stored in the un-zoned namespace 250, the size of the un-zoned namespace 250 increases.

Different L2PTTs may be created for both the zoned namespace 200 and the un-zoned namespace 250. Each L2PTT has a respective indirection unit, which defines the size of the data in the NAND array that a single entry in the L2PTT refers to. Accordingly, a large indirection unit size means that a single entry in the respective L2PTT refers to a larger amount of data in the NAND array relative to a small indirection unit size.

For example, FIGS. 3-6 are diagrams illustrating example L2PTT tables of varying sizes, in accordance with various aspects of the present disclosure. Each example L2PTT table is provided for a zoned namespace having 1000 zones and 20 active zones. Each zone has a size of 100 logical block addresses (also referred to as "LBAs"). The un-zoned namespace in the examples of FIGS. 3-6 has a size of N LBAs.

Figure 3:
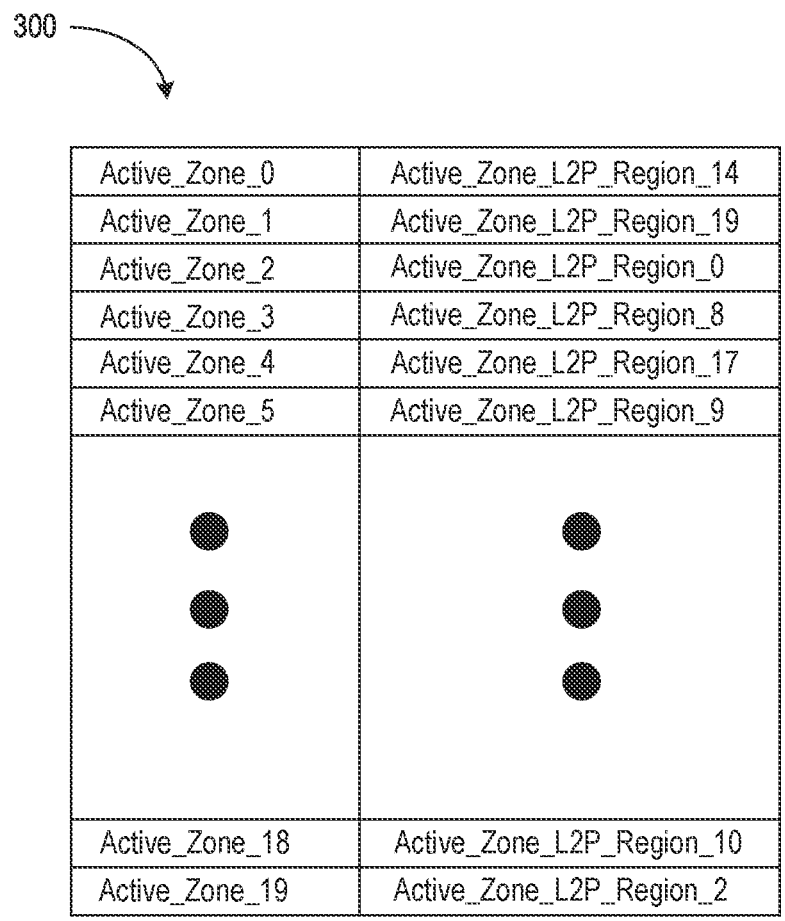
FIG. 3-6 are diagrams illustrating example L2PTT tables of varying sizes, in accordance with some embodiments of the present disclosure.

FIG. 3 is a diagram illustrating an example of a first L2PTT 300. The first L2PTT 300 is a dynamic table that maps current active zones in the plurality of zones 220 to different regions in a second L2PTT 400, described in more detail below. Accordingly, the size of the first L2PTT 300 depends on the total number of active zones that are supported. In the example of FIG. 3, the first L2PTT 300 is a two-dimensional table, where each entry has a size of 2 bytes. As new zones are opened to write, the Active_Zone_ID is updated.

Figure 4:
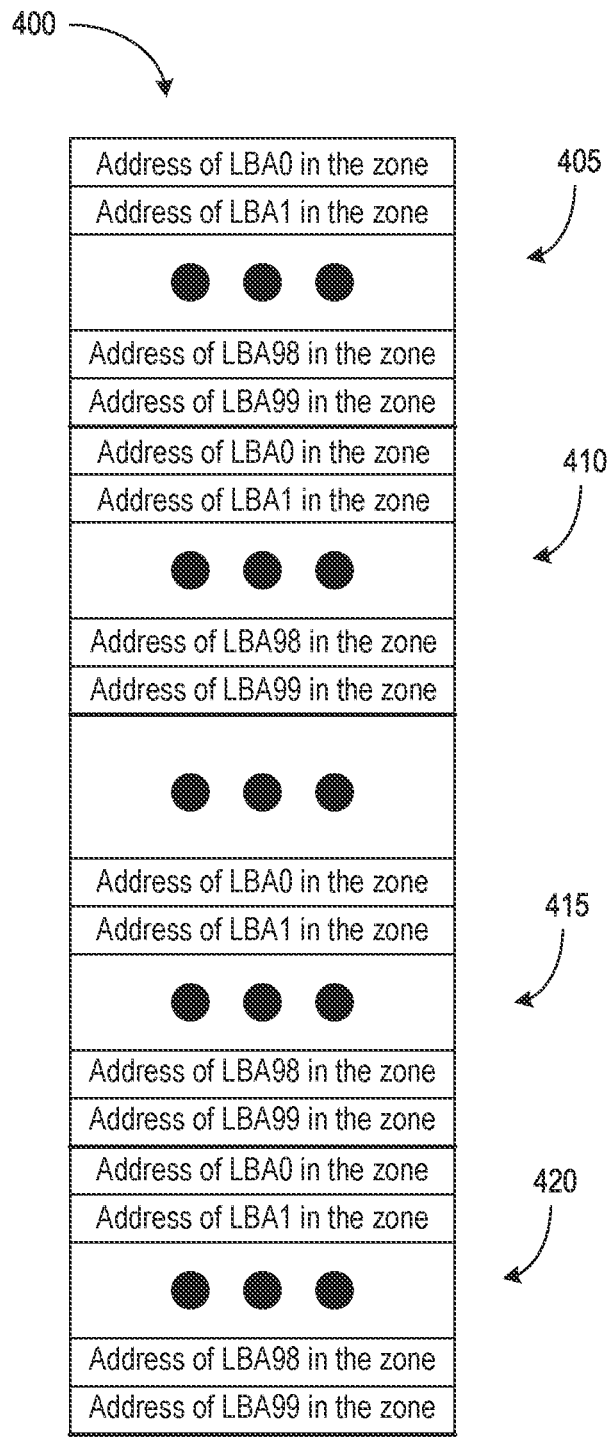

FIG. 4 is a diagram illustrating an example of the second L2PTT 400. The second L2PTT 400 is a dynamic table that maps the data of the current active zones in the plurality of zones 220. Accordingly, the size of the second L2PTT 400 depends on the total number of active zones that are supported, and the size of each of the zones 220. Additionally, the indirection unit associated with the second L2PTT 400 has a small indirection unit size, such as approximately 4 KB. As the second L2PTT 400 maps data of active zones, the second L2PTT 400 is referred to during WRITE commands. However, in some instances, the second L2PTT 400 is also referred to during READ commands, as data may be read from an active zone.

In the example of FIG. 4, the second L2PTT 400 is a one-dimensional table where each entry has a size of 2 bytes and the indirection unit size is 4 KB. The second L2PTT 400 includes a plurality of active zones, such as a first active zone 405, a second active zone 410, a third active zone 415, and a fourth active zone 420. While only a limited active zone regions are illustrated, the second L2PTT 400 includes entries for all 20 active zones. Additionally, the second L2PTT 400 includes entries for each LBA included in the active zones. The base address of each active zone (e.g., each region) is derived from the base address of the second L2PTT 400.

Figure 5:
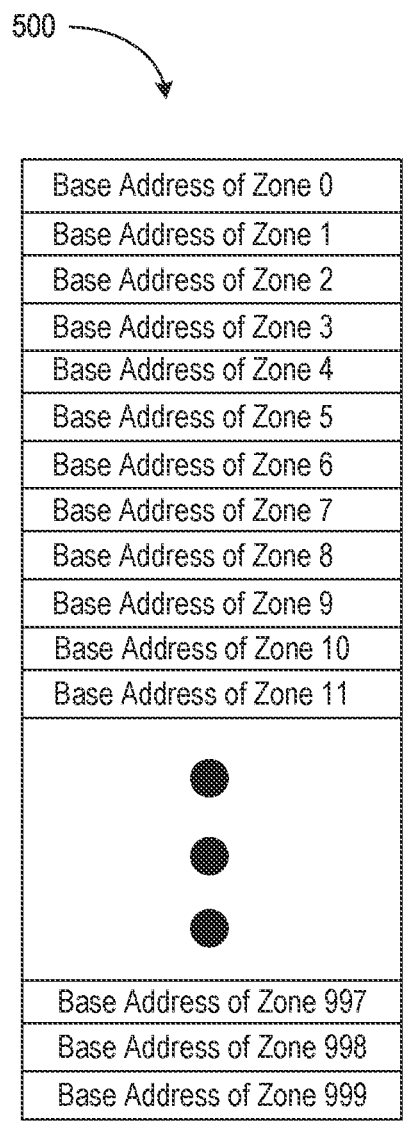

FIG. 5 is a diagram illustrating an example of a third L2PTT 500. The third L2PTT 500 is a static table that maps the data of the plurality of zones 220 (e.g., both the active zones and the closed zones). Accordingly, the size of the third L2PTT 500 is dependent on the total number of the plurality of zones 220. The indirection unit associated with the third L2PTT 500 has a larger indirection unit size relative to the indirection size of the second L2PTT 400, such as approximately 16 KB.

In some instances, as data is written in a sequential manner in the plurality of zones 220, the starting address of zone data is stored in the third L2PTT 500. Additionally, when internal recycling of a zone is performed, the entire zone data is moved in the same sequential manner such that only changes to the base address are performed. In effect, contents of such a zone will still be referred to from the third L2PTT 500, as only the base address is changed.

In the example of FIG. 5, the third L2PTT 500 is a one-dimensional table, where each entry has a size of 4 bytes and the indirection unit size is one full zone. The address of data within a zone is mathematically derived from the base address of the zone, as the data is sequentially written.

Figure 6:
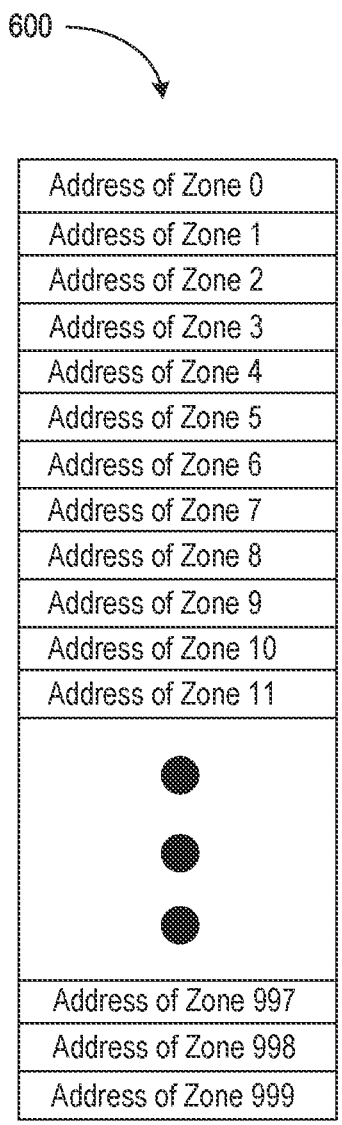

FIG. 6 is a diagram illustrating an example of a fourth L2PTT 600. The fourth L2PTT 600 maps the data of the un-zoned namespace 250. As the un-zoned namespace 250 is typically smaller in size (relative to the zoned namespace 200), the fourth L2PTT 600 may have a smaller indirection unit size by default relative to the indirection unit size of the third L2PTT 500, such as approximately 4 KB. However, should a larger un-zoned namespace 250 be used, the indirection unit size of the fourth L2PTT 600 is increased, such as to approximately 16 KB.

Additionally, as described in more detail below, the indirection unit size of the fourth L2PTT 600 may be decreased for regions within the un-zoned namespace 250 that store hot data. In the example of FIG. 6, the fourth L2PTT 600 is a one-dimensional table, where each entry has a size of 4 bytes and the indirection unit size is 4 KB.

Figure 7:
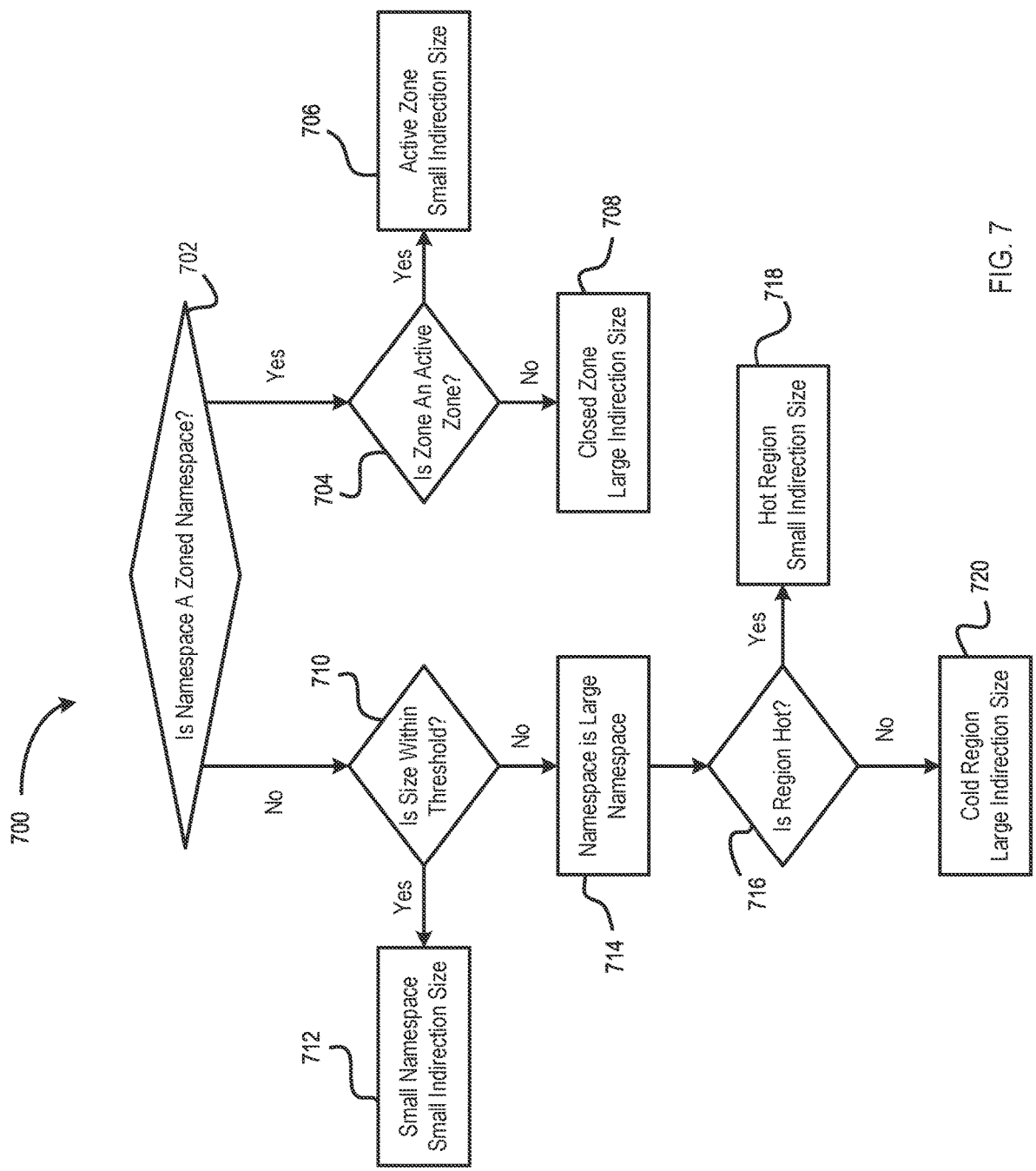
FIG. 7 is a flowchart illustrating a method of determining a L2PTT, in accordance with some embodiments of the present disclosure.

FIG. 7 provides a method 700 for selecting an L2PTT for a given namespace. The method 700 includes determining, with the data storage device controller 120, whether the namespace is a zoned namespace, such as zoned namespace 200 (at decision block 702). When the namespace is a zoned namespace ("YES" at decision block 702), the method 700 includes determining, with the data storage device controller 120, whether the respective zone (such as a zone 220) is an active zone (at decision block 704). When the zone is an active zone ("YES" at decision block 704), the method 700 includes selecting, with the data storage device controller 120, an L2PTT with a small indirection unit size, such as an L2PTT with an indirection unit size of 4 KB (at block 706). When the zone is a closed zone ("NO" at decision block 704), the method 700 includes selecting, with the data storage device controller 120, an L2PTT with a large indirection unit size, such as an L2PTT with an indirection unit size of 16 KB (at block 708). Accordingly, an L2PTT with a small indirection unit size is reserved for writing actions, and an L2PTT with a large indirection unit size (relative to the small indirection unit size) is reserved for read actions. In some instances, the L2PTT with the small indirection unit size will be used for read actions, as the zone may still be active.

Returning to decision block 702, when the namespace is not a zoned namespace (for example, the un-zoned namespace 250) ("NO" at decision block 702), the method 700 includes determining, with the data storage device controller 120, whether the size of the un-zoned namespace is within a size threshold (at decision block 710). When the size of the un-zoned namespace is within the size threshold ("YES" at decision block 710), the method 700 includes selecting, with the data storage device controller 120, an L2PTT with a small indirection unit size (at block 712). For example, the small indirection unit size is a 4 KB indirection unit size. When the size of the un-zoned namespace is not within the size threshold ("NO" at decision block 710), the method 700 includes determining, with the data storage device controller 120, the un-zoned namespace is a large un-zoned namespace (at block 714).

When the data storage device controller 120 determines the un-zoned namespace is a large un-zoned namespace, the method 700 includes determining, with the data storage device controller 120, whether the respective region of the un-zoned namespace is a hot region (e.g., experiencing a high number of overwrite operations) (at decision block 716). When the region of the un-zoned namespace is a hot region ("YES" at decision block 716), the method 400 includes selecting, with the data storage device controller 120, an L2PTT with a small indirection unit size (at block 718). For example, the small indirection unit size is a 4 KB indirection unit size.

When the region of the un-zoned namespace is not a hot region ("NO" at decision block 716), the method 700 includes selecting, with the data storage device controller 120, an L2PT table with a large indirection unit size (at block 720). For example, the large indirection unit size is a 16 KB indirection unit size.

Figure 8:
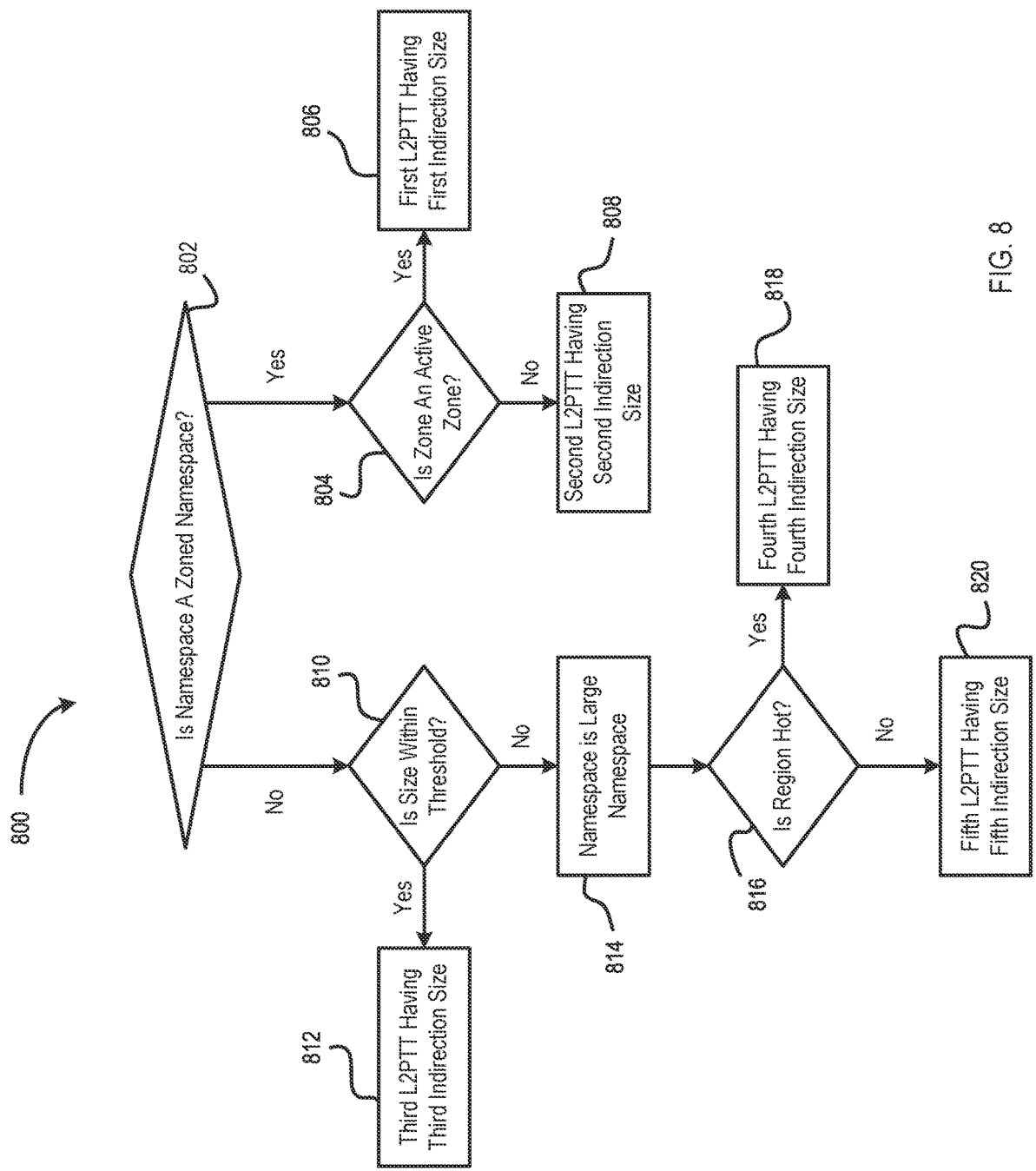
FIG. 8 is a flowchart illustrating another method of determining a L2PTT, in accordance with some embodiments of the present disclosure.

FIG. 8 provides another method 800 for selecting an L2PTT for a given namespace. The method 800 includes determining, with the data storage device controller 120, whether the namespace is a zoned namespace, such as zoned namespace 200 (at decision block 802). When the namespace is a zoned namespace ("YES" at decision block 802), the method 800 includes determining, with the data storage device controller 120, whether the respective zone (such as a zone 220) is an active zone (at decision block 804). When the zone is an active zone ("YES" at decision block 804), the method 800 includes selecting, with the data storage device controller 120, a first L2PTT with a first indirection unit size, such as a small indirection unit size (at block 806). When the zone is a closed zone ("NO" at decision block 804), the method 800 includes selecting, with the data storage device controller 120, a second L2PTT with a second indirection unit size (at block 808).

Returning to decision block 802, when the namespace is not a zoned namespace (for example, the un-zoned namespace 250) ("NO" at decision block 802), the method 800 includes determining, with the data storage device controller 120, whether the size of the un-zoned namespace is within a size threshold (at decision block 810). When the size of the un-zoned namespace is within the size threshold ("YES" at decision block 810), the method 800 includes selecting, with the data storage device controller 120, a third L2PTT having a third indirection unit size (at block 812). When the size of the un-zoned namespace is not within the size threshold ("NO" at decision block 810), the method 800 includes determining, with the data storage device controller 120, the un-zoned namespace is a large un-zoned namespace (at block 814).

When the data storage device controller 120 determines the un-zoned namespace is a large un-zoned namespace, the method 800 includes determining, with the data storage device controller 120, whether the respective region of the un-zoned namespace is a hot region (e.g., experiencing a high number of overwrite operations) (at decision block 816). When the region of the un-zoned namespace is a hot region ("YES" at decision block 816), the method 800 includes selecting, with the data storage device controller 120, a fourth L2PTT with a fourth indirection unit size (at block 818). When the region of the un-zoned namespace is not a hot region ("NO" at decision block 816), the method 800 includes selecting, with the data storage device controller 120, a fifth L2PTT with a fifth indirection unit size (at block 820).

In some instances, the first indirection unit size, the second indirection unit size, the third indirection unit size, the fourth indirection unit size, and the fifth indirection unit size are each different sizes, providing for flexibility in the indirection unit sizes of the L2PTT tables. In other instances, the first indirection unit size, the second indirection unit size, the third indirection unit size, the fourth indirection unit size, and the fifth indirection unit size may be either the small indirection unit size (e.g., 4 KB) or the large indirection unit size (e.g., 16 KB). In yet other instances, the first indirection unit size, the second indirection unit size, the third indirection unit size, the fourth indirection unit size, and the fifth indirection unit size may be any combination of indirection unit sizes as long as there are two or more indirection unit sizes.

By varying the size of the unit of indirection, less memory is needed for storing the various L2PTTs. For example, Table 1 provides a comparison of a memory device (such as an SSD) having a single, static L2PTT compared with the use of zoned and un-zoned namespaces having L2PTTs of varying indirection unit sizes. In the example of Table 1, the total memory space is 1 TB, the size of the un-zoned namespace is 4 GB, the zoned namespace includes 100 zones of 10 GB each, and 10 zones are active. Additionally, in the example of Table 1, the size of the First L2PTT 300 is negligible and not shown. Table 1 is a non-limiting example, and other sizes of the zones, total memory size, size of the unit of indirection, and sizes of the L2PTTs are possible. Table 1 is provided for ease of understanding.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage controller comprising:
   a memory interface configured to interface with a memory, the memory including a zoned namespace, the zoned namespace including a plurality of zones;
   a controller memory including two or more logical-to-physical translation tables (L2PTTs); and
   an electronic processor communicatively connected to the controller memory, the electronic processor configured to:
      receive data to be stored in a zone of the plurality of zones,
      determine whether the zone is an active zone,
      select, in response to determining that the zone is the active zone, a first L2PTT having a first indirection unit size, and
      select, in response to determining that the zone is not the active zone, a second L2PTT having a second indirection unit size,
      wherein the first indirection unit size is smaller than the second indirection unit size.

2. The data storage controller of claim 1, wherein the first indirection unit size is 4 KB, and wherein the second indirection unit size is 16 KB.

TABLE 1

Comparison of Prior SSDs with Multiple Indirection Sizes for L2PTTs

| Prior SSD | Multiple Indirection Sizes for L2PTTs |
|---|---|
| Unit of indirection = 4 KB<br>Total size of the drive = 1 TB<br>Size of an entry in lookup = 4 B<br>Size of the L2PTT = (1 TB/4 KB) * 4 B = 1 GB<br>Total size of the lookup is 1 GB (~1% of the drive size) | Fourth L2PTT 600<br>Unit of indirection = 4 KB<br>Total size of the un-zoned namespace = 4 GB<br>Size of an entry in Fourth L2PTT 360 = 4 B<br>Size of the Fourth L2PTT 360 = (4 GB/4 KB) * 4 B = 4 MB<br>Second L2PTT 400<br>Unit of indirection = 4 KB<br>Total size of active zones = 10 active zones *10 GB = 100 GB<br>Size of an entry in Second L2PTT 320 = 4 B<br>Size of the Second L2PTT 320 = (100 GB/4 KB) * 4 B ~= 100 MB<br>Third L2PTT 500<br>Unit of indirection = Negligible (Just starting address of the Zone data)<br>Sie of each zone = 4 B<br>Total size of the lookup table = 100 zones * 4 B = 400 Bytes<br>Total Size of the lookup is ~104 MB (90% reduction in RAM size) |

3. The data storage controller of claim 1, wherein the memory further includes an un-zoned namespace, and wherein the electronic processor is further configured to:
receive data to be stored in the un-zoned namespace,
determine whether a size of the un-zoned namespace is within a size threshold, and
select, in response to determining that the size of the un-zoned namespace is within the size threshold, a third L2PTT having a third indirection unit size.

4. The data storage controller of claim 3, wherein the electronic processor is further configured to:
determine that the size of the un-zoned namespace exceeds the size threshold, and
increase, in response to the size of the un-zoned namespace exceeding the size threshold, the indirection unit size of the third L2PTT to the second indirection unit size.

5. The data storage controller of claim 4, wherein the electronic processor is further configured to:
determine whether a region of the un-zoned namespace is a hot region,
select, in response to determining that the region of the un-zoned namespace is the hot region, a fourth L2PTT having a fourth indirection unit size, and
select, in response to determining that the region of the un-zoned namespace is not the hot region, a fifth L2PTT having a fifth indirection unit size.

6. The data storage controller of claim 1, wherein a size of the first L2PTT and a size of the second L2PTT are dependent on a number of the plurality of zones.

7. The data storage controller of claim 1, wherein each zone of the plurality of zones has an equal size.

8. The data storage controller of claim 1, wherein the electronic processor is further configured to:
select the zone in which the data is stored based on whether an adjacent zone is an active zone.

9. A method comprising:
receiving, with an electronic processor of a data storage controller, data to be stored in a namespace;
determining whether the namespace includes a plurality of zones;
determining, in response to determining that the namespace includes the plurality of zones, whether a first zone of the plurality of zones is active;
selecting, in response to determining that the first zone is the active zone, a first logical-to-physical translation table (L2PTT) having a first indirection unit size; and
selecting, in response to determining that the first zone is not the active zone, a second L2PTT having a second indirection unit size.

10. The method of claim 9, wherein the first indirection unit size is smaller than the second indirection unit size.

11. The method of claim 9, further comprising:
determining, in response to determining that the namespace does not include the plurality of zones, whether a size of the namespace is within a size threshold; and
selecting, in response to determining that the size of the namespace is within the size threshold, a third L2PTT having a third indirection unit size.

12. The method of claim 11, further comprising:
increasing, in response to determining that the size namespace is not within the size threshold, the indirection unit size of the third L2PTT.

13. The method of claim 12, further comprising:
determining whether a region of the namespace is a hot region; and
reducing, in response to determining that the region of the namespace is a hot region, the indirection unit size of the third L2PTT.

14. A memory device that supports multiple indirection unit sizes for logical-to-physical translation tables (L2PTTs), the memory device comprising:
a memory including a plurality of L2PTTs; and
a controller configured to select one of the plurality of L2PTTs based on whether a namespace in which to store data is a zoned namespace.

15. The memory device of claim 14, wherein the controller is configured to select one of the plurality of L2PTTs in response to determining that the namespace is an active zone.

16. The memory device of claim 14, wherein the controller is configured to select one of the plurality of L2PTTs based on a size of the namespace.

17. The memory device of claim 16, wherein the controller is configured to select one of the plurality of L2PTTs based on the size of the namespace in response to determining that the namespace is not a zoned namespace.

18. The memory device of claim 14, wherein the controller is configured to adjust a size of one of the plurality of L2PTTs based on determining that a region of the namespace is a hot region.

19. The memory device of claim 14, wherein the plurality of L2PTTs includes a first L2PTT having a first indirection unit size and a second L2PTT having a second indirection unit size, and wherein the first indirection unit size is smaller than the second indirection unit size.

20. The memory device of claim 19, wherein the first indirection unit size is 4 KB, and wherein the second indirection unit size is 16 KB.

* * * * *